Feb. 7, 1961 D. GOLD 2,970,795
BI-AREA PILOT PARACHUTE
Filed June 12, 1959 4 Sheets-Sheet 1

INVENTOR.
DAVID GOLD
BY
ATTORNEYS

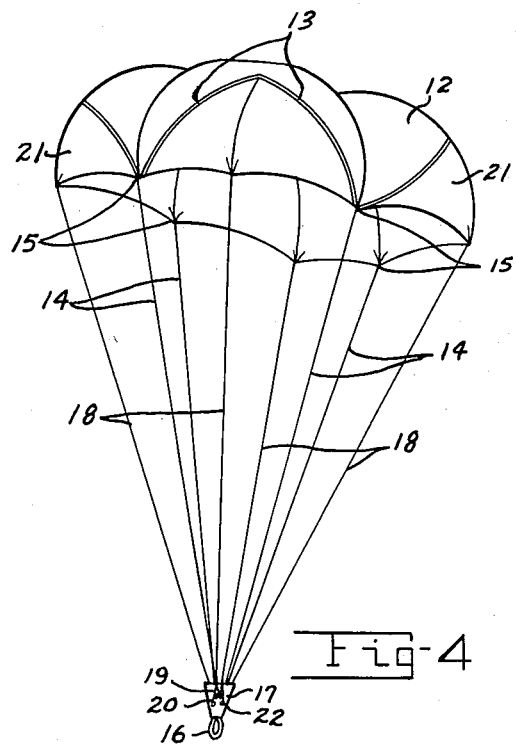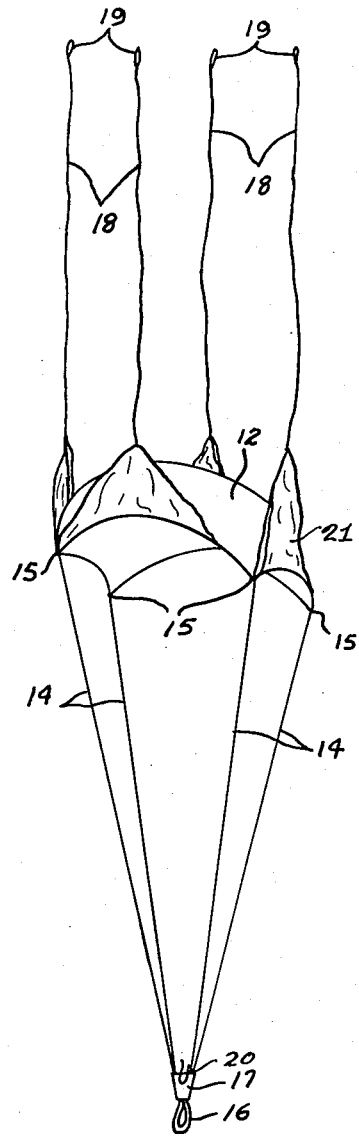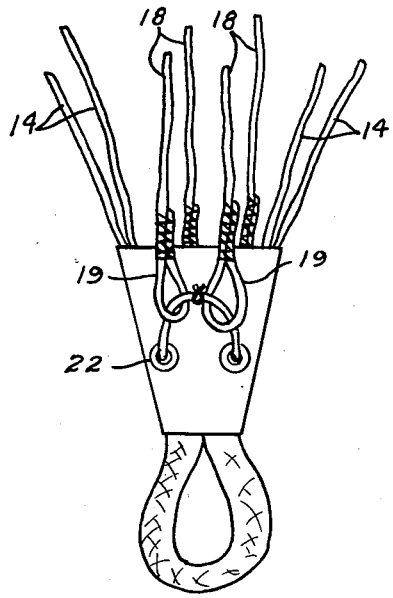

Feb. 7, 1961     D. GOLD     2,970,795
BI-AREA PILOT PARACHUTE
Filed June 12, 1959     4 Sheets-Sheet 3
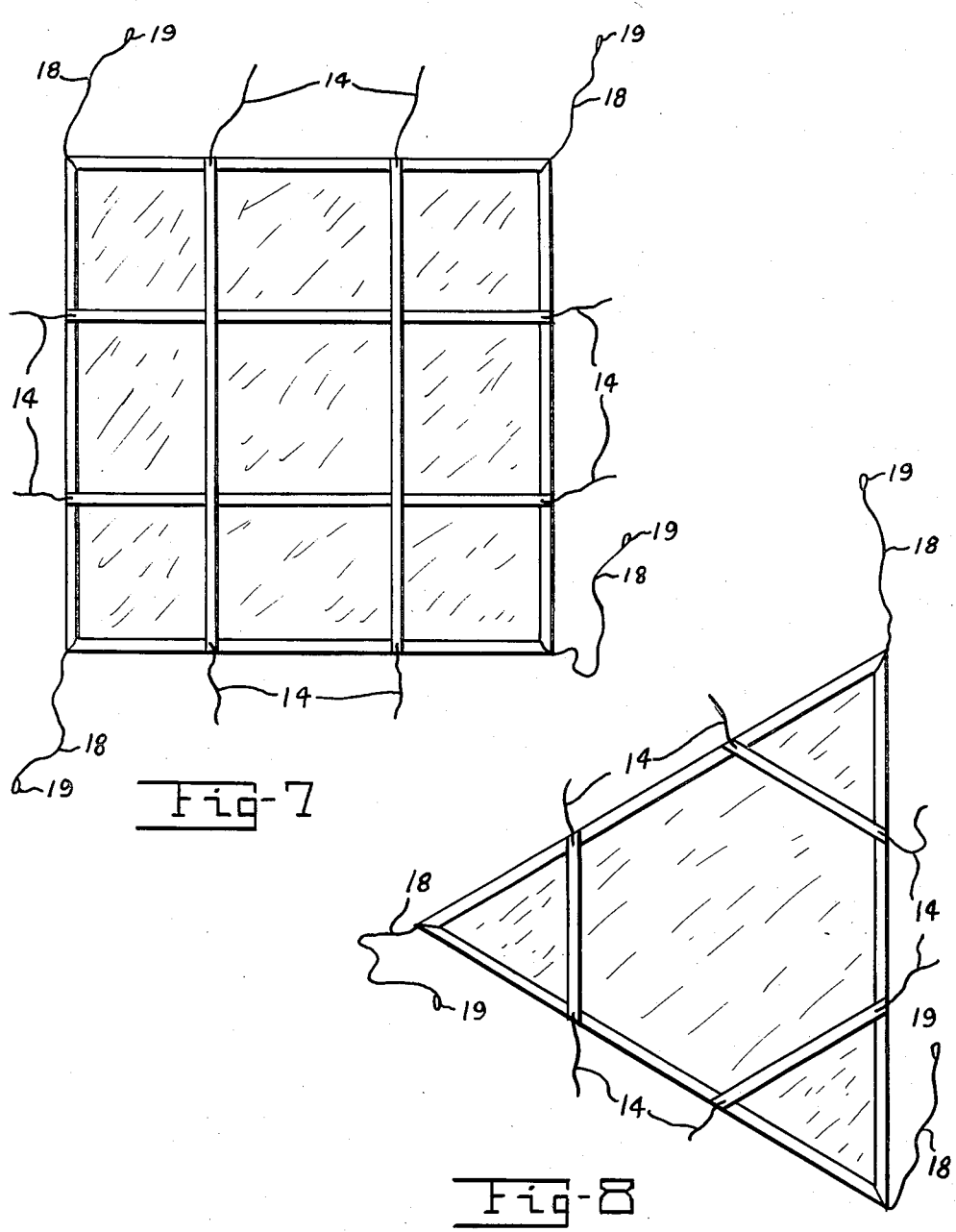
INVENTOR.
DAVID GOLD
BY
ATTORNEYS Feb. 7, 1961   D. GOLD   2,970,795
BI-AREA PILOT PARACHUTE
Filed June 12, 1959   4 Sheets-Sheet 4

INVENTOR.
DAVID GOLD
BY
Wade Koontz
ATTORNEYS

United States Patent Office 2,970,795
Patented Feb. 7, 1961

2,970,795

BI-AREA PILOT PARACHUTE

David Gold, 10007 Pali Ave., Tujunga, Calif.

Filed June 12, 1959, Ser. No. 819,785

6 Claims. (Cl. 244—142)

(Granted under Title 35, U.S. Code (1952), sec. 266)

The invention described herein may be manufactured and used by or for the United States Government for governmental purposes without payment to me of any royalty thereon.

The present invention relates generally to improvements in parachutes and, as illustrated herein, relates more particularly to a new and improved pilot-parachute design.

The use of pilot parachutes is well known, and they have become a very important and vital piece of equipment for parachute assemblies and systems. A pilot parachute, commonly known as a pilot chute and by which name it will be referred to in this description, is used to deploy a parachute system's main canopy or deployment bag out of the parachute's container or pack into the line of flight where the air can then inflate the main canopy. A typical sequence of operation is as follows: The pilot chute, which is attached to the apex of the main parachute or canopy, or to the deployment bag containing the main canopy is usually ejected out of the parachute pack or some other housing by the use of either a spring, pyrotechnic device, or some other energizing means. The pilot chute inflates and offers high drag to the air and this drag force then deploys the main canopy, or the deployment bag, as the case may be, out of the parachute system's pack into the line of flight. Inflation of the main parachute follows.

The pilot chute is small compared to the main canopy and must be designed and dimensioned so that it is large enough to develop sufficient drag force to deploy the main canopy, or the deployment bag in an adequate and positive manner. However, if the pilot chute is over-dimensioned, it will create drag forces of such high magnitude that objectional and dangerous stresses will be placed on the entire parachute system. The size, therefore, of the pilot chute has a definite relationship to the diameter of the main parachute being deployed, the configuration of the whole deployment system, and finally, the airspeed of the store or load at the time the parachute system is initiated. The first two considerations are constant with any certain parachute system; the release velocity in many cases is not, even in systems where it is attempted to initiate relase of the parachute system at a predetermined velocity.

Therefore, there is a need for a simple and positive design pilot chute which is capable of presenting a large projected area to the air at lower release velocities in order to produce sufficient drag forces at these lower velocities, or a small projected area at high release velocities in order to produce sufficient drag forces which are adequate for positive deployment at these higher launch velocities without setting up dangerous stresses in the parachute system when the pilot chute is released at the higher velocities. The present invention accomplishes this.

One object of the present invention is to provide a pilot parachute canopy design that is capable of presenting two different projected areas to the air upon release at low and high speeds; this being accomplished by positioning the suspension lines of the pilot chute in such a manner and geometrically forming the pilot chute canopy in such a manner that under low loads a large projected force area is presented to the air flow, and under high loading, simultaneous rupture of certain suspension lines of the pilot chute permits the configurations of the pilot chute to change into a smaller projected area.

Another object of this invention is to provide a means of construction whereby under certain predetermined high loading conditions, a predetermined group of suspension lines will simultaneously be released to reduce the projected area of the pilot parachute.

Another object of this invention is to provide a system whereby during the initial stages of the parachute deployment a large projected area is attained and a small projected area is attained during the latter portion of the pilot chute deployment sequence.

Other objects of this invention are to improve generally upon the construction and operation of pilot parachutes for use in deployment at low and high air speeds.

Other objects and advantages of this invention will become apparent from the following description and accompanying drawing in which like reference characters refer to like parts in the several figures.

Drawings

Figure 4 is a view of a square type of pilot chute as it appears when inflated at its largest projected diameter when all suspension lines are intact.

Figure 5 is a view of the square type of pilot chute as it appears when the corner lines have failed presenting a smaller projected area.

Figure 6 is an enlarged fragmentary detailed view showing the method of simultaneous line release as depicted for the square pilot chute.

Figures 7 and 8 are views of some canopy shapes which can be utilized to obtain bi-area features.

Figure 1:
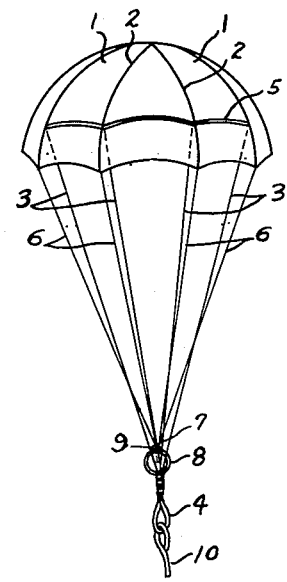
Figure 1 is a view of a circular type of pilot chute with a system of failable secondary lines when inflated to its large projected area.
Figure 2:
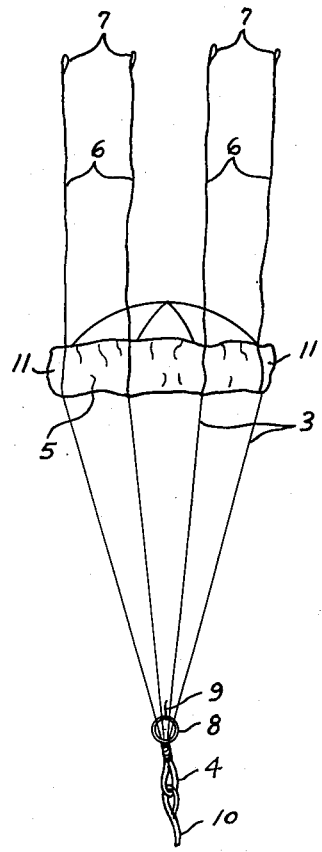
Figure 2 is a view of the same circular type of pilot chute after high speed opening stresses have ruptured the failable suspension lines, thus resulting in a pilot chute with a smaller projected drag surface.
Figure 3:
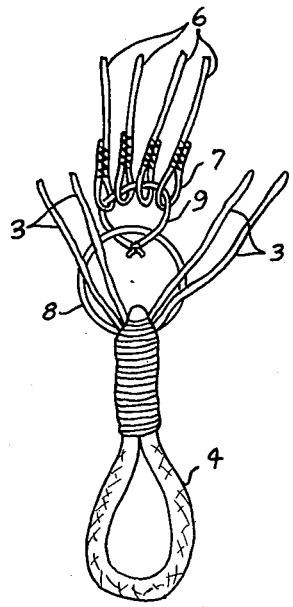
Figure 3 is a view of the suspension juncture point illustrating one possible system of simultaneously freeing the failable lines during high speed launchings.

Referring now more particularly to Figures 1 and 2 that embodiment consists of a circular pilot parachute canopy fabricated of gores 1, assembled with a system of seams 2 in any of a number of ways familiar to those cognizant of the parachute art. This particular embodiment is equipped with a set of permanent inner suspension lines 3 which terminated in a loop 4 at their confluence point. For structural reasons, a reinforcement band 5 may be placed around the canopy 1. The outside or failable suspension lines indicated at 6, are attached to the bottom of the skirt of the canopy at one end and each has a loop 7 on its other or lower end as seen in Figure 3. The upper part of the confluence loop 4 is equipped with a textile or metal ring 8. The suspension line terminal loops 7 for the failable lines 6 are all gathered at the ring 8, to which they are secured with a single break cord 9 of a predetermined break strength, in such a manner that rupture of the break cord 9 will simultaneously release all the outer suspension lines 6. At the relatively low air speeds, the pilot chute, once ejected, fills with air and takes the large configuration in Figure 1. Due to the low forces, the predetermined strength break cord 9 does not fail, and thus the pilot chute retains its large projected area and then transmits its drag through the bridle cord 10 to the canopy or the deloyment bag to deploy the main canopy or parachute.

Referring to Figure 2, it can be seen that when the pilot chute is ejected while the store is travelling at a relative high velocity, the imposed high loading on the outer or failable suspension lines 6 ruptures or breaks the common overload break cord 9. This frees the failable suspension lines 6 simultaneously from the ring 8. The freed portions of the skirt 11 flutters back and only the center portion 1 and 2 (Fig. 1) of the pilot chute remains inflated, thus giving a smaller projected area pilot chute which prevents rupture and damage to the pilot chute and system when it is deployed at high speeds.

In Figure 3 the lower portions of failable and nonfailable suspension lines are disclosed on an enlarged scale. The view shows the confluence loop 4, which is formed on or from the inner or nonfailable suspension lines 3. Aattached to this loop 4 is a metal or textile loop or ring 8 to which are attached with a predetermined size or strength break cord 9 the looped ends 7 of the outer failable suspension lines 6. The operation of the system when the pilot chute has been released at relatively low and at relatively high speeds has been explained.

Figure 4 illustrates a similar embodiment in which the pilot chute is in the form of a square canopy 12. The square pilot chute canopy 12 is provided with a system of reinforcing tapes 13.

Permanent or nonfailable suspension lines 14 are attached to the square canopy 12 at the points 15 midway between the corners. The permanent lines 14 are connected to form the load suspension loop 16, these being disposed in a flattened cover 17.

The failable lines 18 are connected to the corners of the square canopy 12 and terminate at their lower ends in individual loops 19. These loops 19 are gathered together at the flattened confluence point cover 17 where they are all secured with a break cord 20 of predetermined strength, as shown, in such a manner that rupture of the break cord 20 will release all corner suspension lines 18 simultaneously. When the pilot chute is released at relatively low speeds, below the breaking strength of the break cord 20, the cord does not rupture and both groups of suspension lines 14 and 18 operate to permit the pilot chute to inflate to its full size and present its maximum projected area, which condition is desired for low speed deployments.

Figure 5 illustrates the configuration assumed by the square pilot chute described in Figure 4 when launched during a relatively high speed parachute actuation. Upon inflation of the square canopy 12, the large load caused by the high speed imposed on the break cord 20 causes the break cord to rupture. This frees the failable lines 18 and permits the corners 21 of the pilot chute to fold back, the central area of the canopy, sustained by the permanent lines 14, remains inflated and offers a small projected area to the air stream, which is the condition desired for high speed parachute deployments.

Figure 6 is a detailed enlarged view of the lower portion of the square pilot chute and discloses the permament suspension lines 14 and their confluence loop inclosed in the flattened cover 17. Through this cover 17 are set two grommets 22, the releasable corner suspension lines 18 being formed wtih loops 19 which are held in place with a single predetermined strength break cord 20 which passes through the grommets 22 to releasably secure the suspension lines 18 on opopsite sides of the flattened cover 17.

Figures 7 and 8 illustrate some other geometric configurations which may be applied to the design of pilot chute canopies in order to produce bi-area parachutes employing the system of freeing the corners under high excessive loading as described above. The design shown in Figures 4 and 5 automatically provides about a 50% reduction in surface area in high speed over low speed release. The arrangement shown in Figure 7, which is noticed to comply with Figures 4 and 5 shows two permanent lines 14 on each side of the canopy. When the corner lines 18 fail in this configuration, only a smaller portion of the corners 21 fold back, which results in less reduction in area. By altering the number and spacing of the permanent lines 14 the minimum projected area may be varied to suit the requirement of the parachute system.

Figure 8 illustrates a triangular configuration of pilot chute canopy. In this view the canopy is provided with reinforcing tapes 13, permanent suspension lines 14 and corner failable suspension lines 18.

Figure 9:
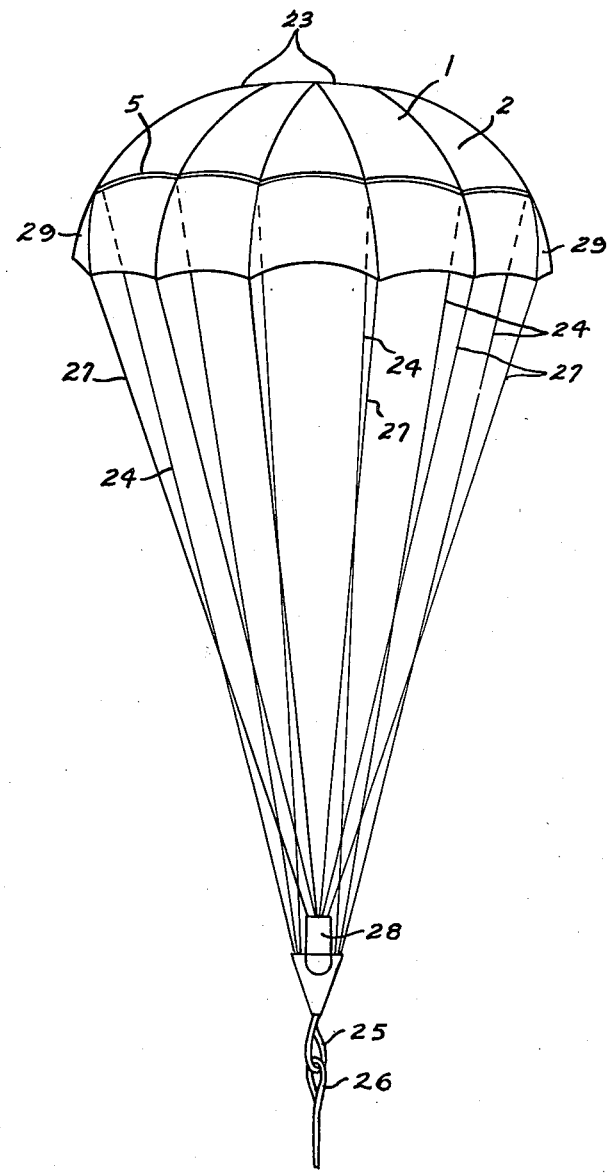
Figure 9 is a further view of one possible system designed to provide a sustained large projected area during the initial phase of parachute deployment and a small projected area during the later phase of pilot parachute deployment.

As shown in Figure 9, some instances of parachute recovery, it might be highly desirable to maintain a constant high drag during the initial phase of the deployment and provide a time delay release or severance device 28 to reduce the drag area during a later phase of the deployment.

This could be true when the pilot chute is utilized as an extraction chute at the beginning of the recovery sequence, or when the pilot chute must remove a deployment bag from a tight housing quarter. Immediately following its extraction task, which is accomplished with the large projected area, the extraction pilot chute is caused to reduce its projected area by line severance as outlined in this description. This, of course, would reduce opening forces. In Figure 9 the pilot chute is shown inflated during the initial phase of the recovery sequence. The permanent lines 24 are formed into a confluence point loop 25. Leading from this loop 25 is a bridle cord or web 26 which leads to the store being recovered and/or the deployment bag. The failable suspension lines 27 terminate in loops which are inclosed in a severance device 28. This severance device may be a powered knife or pyrotechnic cutter, of which there are several types regularly used in parachute systems. After a predetermined time delay (or distance travel), the severance device 28 is excited either electrically or by static line or in any of a number of successfully used methods. Upon actuation of the severance device 28 the failable suspension lines 27 are released and the now freed portion of the canopy 29 deflates and folds back. By virtue of the permanent lines 24, the center portion of the canopy remains inflated, but the pilot chute now presents a smaller projected area to the air stream with a resultant drop in pilot chute drag for the remainder of the deployment sequence. Thus, for certain operations it is possible to achieve a relatively high drag for the beginning of the parachute opening sequence and a low drag for the latter part of the sequence.

I claim:

1. In a pilot parachute, a canopy having an inner permanent drag area, an outer drag area surrounding the inner drag area, permanent suspension lines connecting the periphery of the inner permanent area to a common load sustaining point, a plurality of failable suspension lines connecting the periphery of the outer drag area to said common load sustaining point including common break cord means connected between the failable suspension lines and said common load sustaining point.

2. A high and low speed parachute comprising a drag canopy having a high speed drag area, nonfailable suspension lines connecting the periphery of said high drag area to a common load suspension point, a plurality of low speed drag areas disposed around the high speed drag area, a plurality of failable suspension lines connected at one end to the low speed drag area, said failable suspension lines connected together at their other ends to a second common point adjacent said common load suspension point and a break cord connecting the failable suspension lines at said second common point to the first mentioned suspension line common load suspension point, whereby breakage of said break cord simultaneously releases said failable lines from said load suspension point.

3. A bi-area pilot parachute for high and low speed release comprising, a canopy having a central drag area and a surrounding border drag area, a plurality of permanent load suspension lines connecting periphery of the central drag area to a load suspension point below the canopy, a plurality of failable load suspension lines connected to the periphery of the surrounding border drag area and extending downwardly substantially to said load suspension point, and breakable securing means connecting the lower ends of the failable load suspension lines to said permanent load suspension lines to said permanent load suspension lines at said load suspension point, said breakable securing means having a predetermined break value whereby when the drag force on said canopy after deployment does not exceed said predetermined break value said failable suspension lines retain the border drag area against collapse, and a predetermined increased drag force above said break value exerted on said surrounding drag area tensions said failable load suspension lines to rupture said break cord means and free said failable load suspension lines simultaneously from said permanent load suspension lines to remove the support of said surrounding drag area from said load suspension point.

4. A bi-area pilot parachute for predetermined high and low speed parachute deployment comprising, a canopy having an annular skirt portion, load suspension means disposed below the center of said canopy, a plurality of failable load suspension lines connected around the periphery of said skirt portion and converging downwardly to a common point adjacent said load suspension means, common breakable connecting means connected between said load suspension means and the lower ends of all of said failable load suspension lines, said breakable connecting means formed to rupture and free said failable load suspension lines upon a predetermined upward pull of said failable load suspension lines by said canopy during deployment thereof, a plurality of permanent load suspension lines connected to said canopy in radially spaced relation around the center of the canopy between said center and said failable load suspension lines to provide a permanent predetermined central drag area in said canopy, said permanent load suspension lines converging downwardly below the canopy and permanently secured at their lower ends to said load suspension means, whereby a predetermined excess drag force on said canopy during deployment tensions said failable suspension lines to rupture said common breakable connecting means and cause simultaneous release of said failable suspension lines from said load suspension means to remove the sustaining effect of the portion of said canopy located between said failable load suspension lines and said permanent load suspension lines during deployment of said pilot parachute at air speeds above a predetermined speed.

5. A high and low speed bi-drag area pilot parachute comprising, a pilot chute canopy having a central high speed drag profile area and a surrounding collapsible low speed drag profile area, a plurality of main load suspension lines connected at their upper ends in spaced relation to each other to the perimeter of said central high speed drag profile area and converging downwardly toward a common load sustaining point below the canopy, load suspension means at said common load sustaining point connected to the lower ends of said main load suspension lines, a plurality of failable load suspension lines connected at their upper ends in spaced relation to each other to the outer perimeter of said surrounding collapsible low speed drag profile area and converging downwardly toward said load sustaining means, said failable load suspension lines each having a loop formed at its lower end, a loop formed on said load suspension means, and a break cord secured through said last mentioned loop and through the said loops on said lower ends of said failable load suspension lines having a predetermined break strength for causing said break cord to rupture and simultaneously release said loops on said failable load suspension lines from said loop on said load sustaining means upon a predetermined increase in drag force on said collapsible drag area caused by said pilot chute when deployed while travelling at a speed in excess of a predetermined speed.

6. A high and low speed drag canopy comprising, a central permanent high speed drag profile area and an adjoining surrounding collapsible low speed drag profile area, a plurality of main nonfailable load suspension lines connected at their upper ends to said canopy along the juncture between permanent high speed drag profile area and the collapsible low speed drag profile area and converging downwardly toward a central load suspension point below the canopy, load suspension means connected to the lower ends of said nonfailable load suspension lines at said point, a plurality of failable load suspension lines connected at their upper ends to the outer perimeter of said collapsible low speed drag profile area in spaced relation to each other and converging downwardly toward said central load suspension point, said failable load suspension lines having a retaining loop formed at each of their lower ends, and a break cord passing through all of said loops and connected to all of said nonfailable suspension lines adjacent said load suspension point for releasing all of said failable load suspension lines simultaneously when said break cord is broken, said break cord having a predetermined break strength to resist a predetermined pull of said collapsible canopy low speed drag profile area and breakable to simultaneously release said loops and free said collapsible low speed drag area for collapse when said drag pull on said failable suspension lines exceeds said predetermined pull.

References Cited in the file of this patent

UNITED STATES PATENTS

| 2,371,898 | Lisi | Mar. 20, 1945 |

FOREIGN PATENTS

| 858,140 | France | May 6, 1940 |